United States Patent [19]

Wiggins et al.

[11] 4,441,399
[45] Apr. 10, 1984

[54] INTERACTIVE DEVICE FOR TEACHING MUSICAL TONES OR MELODIES

[75] Inventors: Richard H. Wiggins, Dallas; George Doddington, Richardson, both of Tex.; Craig J. Cato, Littleton, Colo.

[73] Assignee: Texas Instruments Incorporated, Dallas, Tex.

[21] Appl. No.: 301,089

[22] Filed: Sep. 11, 1981

[51] Int. Cl.³ .............................................. G09B 15/00
[52] U.S. Cl. .................................... 84/470 R; 381/49; 381/51
[58] Field of Search ................. 84/454, 470 R, 477 R, 84/1.03, 1.16, DIG. 18; 179/1 SB, 1 SG, 1 SP, 1 SM, 1 VC, 1 SC, 1 SD; 434/319-322, 327; 381/48-51

[56] References Cited
U.S. PATENT DOCUMENTS 3,977,292 8/1976 Fauilli et al. ...................... 84/470 R
3,999,456 12/1976 Tsunoo et al. ........................ 84/1.03
4,206,675 6/1980 Gooch ........................... 84/470 R X
4,281,577 8/1981 Middleton .............................. 84/454
4,321,853 3/1982 Tumblin ....................... 84/470 R X

*Primary Examiner*—William B. Perkey
*Attorney, Agent, or Firm*—William E. Hiller; Leo N. Heiting; Melvin Sharp

[57] ABSTRACT

An electronic learning aid for interactive operation with an operator with capabilities for the synthesis of a tone or sequence of tones. The tone, in the alternative, is used to either prompt the operator to respond in like fashion or is in response to the operator's input of a tone or sequence of tones. In this fashion the learning aid selects a tune to be synthesized and communicates this tonal sequence to the operator who responds by attempting to mimic the sequence. An alternate operation of the learning aid is for the operator to audibly input a tone sequence and for the electronic learning aid to attempt to mimic the sequence of tones.

16 Claims, 7 Drawing Figures

INTERACTIVE DEVICE FOR TEACHING MUSICAL TONES OR MELODIES

BACKGROUND

This invention relates to electronic learning aids and more specifically to musical learning aids.

Until recently electronic learning aids had not been recognized for their potential in instructing the beginning learner. In the past, the electronic aids have been used primarily at the upper educational levels to provide contact with electronics so as to generate a familiarity with their capabilities prior to the entry of the students into the job market.

More recently the electronic learning aids have been utilized at all age levels so as to provide an interactive environment in which the student paces himself and thereby encounters the to-be-learned material at a comfortable pace. Once the material has been adequately learned, to the satisfaction of the student, the student operator progresses to the next level of difficulty at his speed. This mode of operation eliminates the need for constant surveillance and monitoring by an educational instructor, and allows the student to interact with the material in a secure environment since he does not run the risk of peer pressure or instructor scrutiny.

The electronic learning aids have generally focused upon the reading, writing, and arithmetic sides of the learning process. Examples of these learning aids are the "Speak & Spell" TM electronic learning aid and the "Speak & Math" TM electronic learning aid, both manufactured by Texas Instruments Incorporated of Dallas, Texas. These devices audibly communicate to the operator a prompting message to which the operator responds via a keyboard. This response is analyzed as to its correctness relative to the prompting message and an appropriate set of instructions is then obtained; thereafter, the machine again audibly communicates to the operator either a positive reinforcement, when a correct answer has been given, or an informational message informing the operator of the correct answer. In this fashion the electronic learning aid has taken the place of the human instructor; a problem is given, a solution is attempted, and the solution is checked as to its accuracy. Advantages of the electronic learning aid are that it has an unlimited patience with the student and proceeds at a pace desired by the student.

The process of the student responding to a posed question establishes a good ability to respond to definite questions, but this technique alone does not create a depth of understanding. Similarly, a knowledge of reading, writing and arithmetic although necessary in the modern world does not encompass other desirable skills; skills in the arts are equally important to develop.

DESCRIPTION OF THE INVENTION

The present electronic learning aid is comprised of a means for identifying a first tone from an operator generated signal, a means for electronically synthesizing a response tone, and a control means for accepting the information from the means for identifying and communicating to the operator via the means for electronic synthesizing of the tone.

Two primary modes of operation are used by the control means. The first mode of operation is for the control means to select a tone, or a sequence of tones, and to synthesize this tone for the operator to hear. The operator responds by generating a mimic of the tone; and the control means compares the operator's mimic with the synthesized tone so as to reinforce the operator's tonal generation ability.

An alternative mode of operation is for the operator to generate a tone or a sequence of tones which are picked up by the means for identifying and communicated to the control means. The control means attempts to mimic the operator's tone via the electronic synthesizing means. This mimic is reinforceable to the learning aid from the operator. In this mode of operation, the operator/student is acting as an instructor to the electronic learning aid. The student poses a problem (whether it be a sequence of tones, an algebraic problem or the like) and the learning aid attempts an "answer". The learning aid, by allowing the answer to periodically be incorrect, forces the operator to be aware of the correct answer so as to catch the aid in its "mistake".

One of the necessary components of this electronic learning aid is a means for identifying a tone from a signal, typically a voice signal. An analog signal is typically generated by the operator and either acts as a response to the prompting of the electronic learning aid or as a prompting for the electronic learning aid. This analog signal is optionally a single tone or contains a sequence of tones such as a whistled tune.

Each tone contains a fundamental frequency establishing a pitch together with a durational component. A record of pitch with time duration uniquely identifies the tone. Similarly, a sequence of pitch and duration data defines a tone sequence or tune.

Numerous methods exist to extract from an analog signal the real time pitch or fundamental frequency of the signal. One such method is described by Joseph N. Maksym in his article "Real-Time Pitch Extraction by Adaptive Prediction of the Speech Waveform", IEEE Transactions on Audio and Electroacoustics, Vol. AU-21, NO. 3, June 1973, incorporated hereinto by reference. The method described by Maksym operates by performing a short-term prediction of the analog speech. This short-term prediction generates a resultant prediction error so as to detect the presence of glottal excitation which is transformable into pitch frequency.

The pitch extractor or means for identifying a pitch communicates a signal to the control means which may be any one of numerous known data processors. One such data processor which serves this purpose is a TMS 1000 microprocessor available from Texas Instruments Incorporated of Dallas, Texas.

By monitoring the time between changes in the pitch, the control means establishes the time duration of the pitch so as to define the tone. Repeating this operation creates the sequence of tones in the tune.

The control means communicates with a means for electronically synthesizing a pitch. One such electronic synthesizer is described in U.S. Pat. No. 4,209,844 by Brantingham et al, issued on June 24, 1980 incorporated hereinto by reference. The Brantingham et al device utilizes what is referred to as a linear predictive filter in its synthesis of sounds such as speech signals. A speech synthesizer as described by Brantingham et al is also capable of generating various pitches through the manipulation of the so-called pitch parameters. Holding this pitch allows synthesis of the pitch for any duration so as to create the tonal qualities desired.

The speech synthesizer also allows an auditory channel between the control means and the operator to be created. In this fashion the microprocessor chooses an appropriate set of words from a library and communicates their parameters to the speech synthesizer so as to communicate an auditory message to the operator to act as either a prompting message or as a reinforcement message.

A second communication channel is preferably formed between the operator and the control means which is independent of the means for identifying a pitch. This communication channel is preferably a keyboard but optionally is comprised of analog voice recognition means.

Voice recognition is fully described by Edward R. Teja in his article "Voice Input and Output" appearing in Electronic Data News (EDN) Nov. 20, 1979, incorporated hereinto by reference. One method discussed by Teja is the use of a pulse-code-modulation scheme which then utilizes the encoded speech to map to a recognized vocal word.

The use of a keyboard for entry of data and response of the operator/student allows for efficient encoding of the response and totally distinguishes the two forms of input available to the operator, pitch input and keyboard input.

The performance of the hardware so described has two alternate modes. The first mode of operation is where the electronic learning aid performs as an instructor of the operator/student. The aid poses a question to the student in the form "Can you do this?" followed by a sequence of tones. The student responds by attempting to mimic the sequence; the aid matches the student's mimic to the generated sequence and either rewards, typically through praise, or corrects the response of the students.

The level of the complexity of the sequence is alterable through the use of plug in memories such as read only memories (ROM) or the like. The use of a ROM is beneficial since its storage is nonvolatile, thereby not requiring power. As the student/operator progresses, the addition of a more advanced ROM permits the aid to pose new and more difficult problems to the student operator.

The second mode of operation involves the operator/student formulating the problem and thereby "teaching" the aid. The operator poses a problem for the aid to solve. This problem is in the preferred embodiment a sequence of pitches defining an operator generated problem; an alternate embodiment is where the operator generated problem is algebraic or arithmetic in nature. The aid generates data in response to the operator generated problem. This response data is sometimes incorrect either through hardware limitations or through intentionally choosing an incorrect response by the aid. The operator/student evaluates the response data and enters his evaluation data of the response relative to the operator generated problem. The aid, by relating the operator generated problem, the response data of the aid, and the operator generated evaluation data, formulates either a new response or a message correcting the operator's evaluation.

An algebraic example of this interactive operation of the man-machine interface is:

Operator: "2+4−3=?"
Aid: "4"
Operator: "Correct"
Aid: "No it isn't. The correct answer is 3. Do you agree?"

This type of interactive operation has a deeper influence on the learning of the operator since he is now forced to both create problems and to solve them whereas before his only requirement was to solve. Additionally, reinforcement of the operator's action is made through direct reinforcement and a subliminal satisfaction by the operator when he catches the aid in a "mistake".

The invention, together with embodiments thereof are more fully explained by the accompanying figures and their associated descriptions.

DRAWINGS IN BRIEF

Figure 6A:
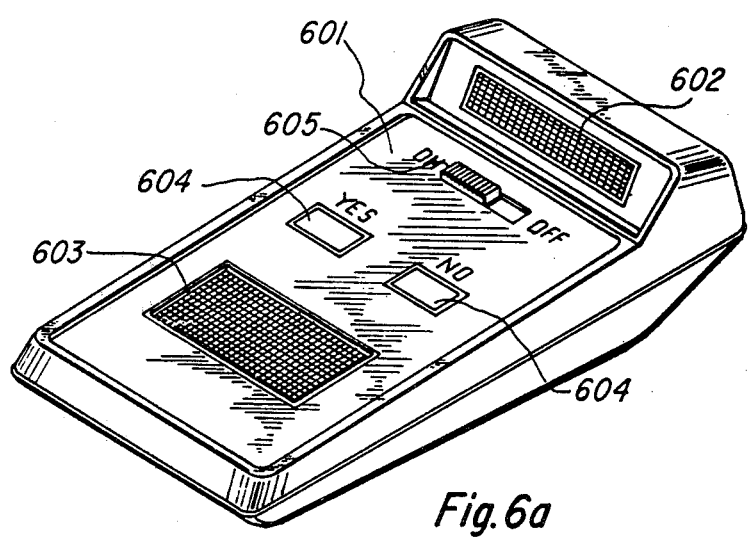
Figure 6B:

FIGS. 6a and 6b pictorially illustrate respective embodiments of the invention.

DRAWINGS IN DETAIL

Figure 1:
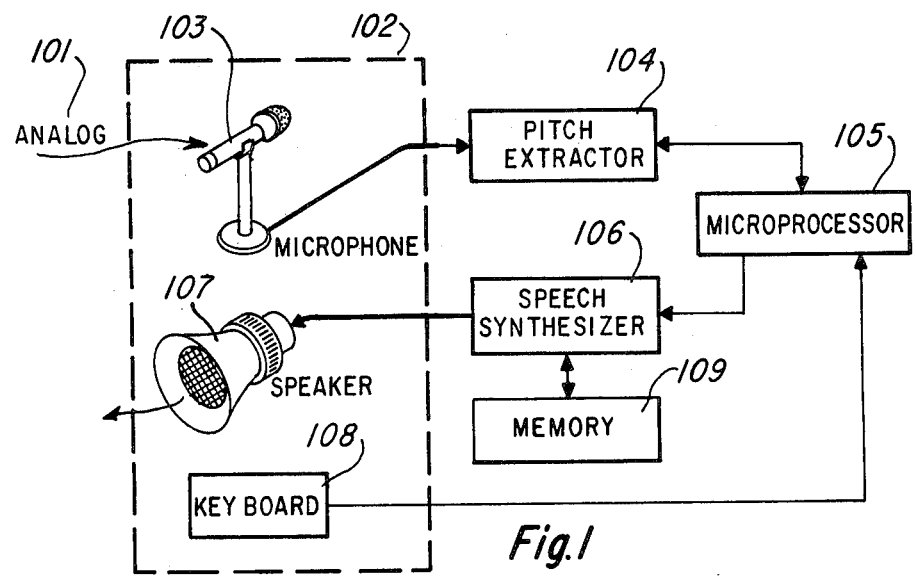
FIG. 1 is a block diagram of an embodiment of the electronic learning aid.

FIG. 1 is a block diagram of the operation of an embodiment of the invention.

An analog signal 101 is received by the microphone 103 and communicated to the pitch extractor 104. The pitch extractor 104 identifies the pitch of the analog signal 101 and communicates data representative of this pitch to the microprocessor 105.

The microprocessor 105 communicates a sequence of data representative of either words or tones to be synthesized to the speech synthesizer 106 which generates signals activating the speaker 107. In this fashion of generating data representative of either words or tones, the microprocessor 105 is able to communicate via the speech synthesizer 106 either a tone to an operator or a phrase indicative of either the status of the operation, a prompting message, or a reinforcing message. This provides an auditory channel to the operator/student.

The microphone 103 and speaker 107 are part of an operator interface 102. This operator interface 102 provides the channel by which the electronic learning aid is capable of communicating with the operator and vice versa. A keyboard 108 is optionally added to the operator interface 102 so as to provide another channel of communication with the microprocessor 105. Another option to the operator interface is the addition of a display means, not shown, which allows a visual representation of the pitches to be given and of messages. In this case, the display can substitute for the synthesizer 106 by illustrating in script form the tones.

The embodiment of FIG. 1 has the ability to change its mode of operation by selectively altering the microprocessor 105. One mode accepts a tone from the operator and attempts to mimic the operator's tone via the speech synthesizer 106. The operator is then prompted to respond by an audible voice signal from the microprocessor 105 via the speech synthesizer 106 in such a form as "Was that the proper tune?" For example, the operator responds via the keyboard 108 "yes" or again reiterates the tune. The mode of operation of the microprocessor 105 also allows the selection of a sequence of tones from the memory or library 109 and subsequent synthesization of the tones via the speech synthesizer 106. Thereafter the operator is prompted to mimic the tune via an auditory spoken message such as "Now you try it." The operator attempts a mimic sequence which is communicated via the pitch extractor 104 to the microprocessor 105 which compares the mimic received to the library sequence and responds to the operator via the speech sythesizer 106 with an appropriate message such as "No, your tune was off, try it again."

In this mode, the sequence of tones from the library 109 is preferably randomly chosen so that a set pattern is avoided. This lack of repetition through random selection maintains the operator's interest since it is now impossible to predict the next tune.

Another operation allows the operator to pose a sequence of tones to the aid which then mimics the tonal sequence. The operator evaluates the aid's mimic and either praises or repeats the tonal sequence for the aid.

This interactive electronic learning aid has the ability in the first operational mode of being "taught" a tune by the operator. Although the electronics are not truly learning from this teaching method, they are assisting in the teaching of the operator since the operator must reiterate and utilize his perceptual ability when "teaching" the electronic learning aid.

Figure 2:
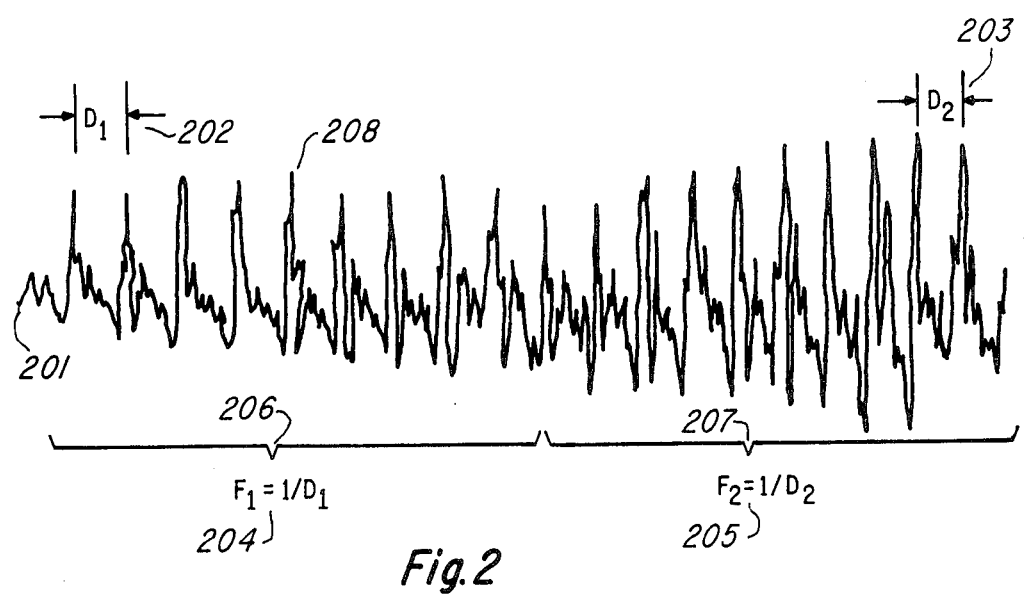
FIG. 2 illustrates the parameters extracted in the analysis of analog speech.

FIG. 2 illustrates the characteristics extracted from the analog speech signal for determination of the pitch given.

The analog signal 201 is comprised of sample frames 206 and 207 along with others not shown. The time duration of the sample frame is variable but preferably is approximately 20 milliseconds in duration. Each sample frame such as 206, has numerous peaks, such as 208, within its domain. The intervals between the occurences of such peaks, $d_1$, 202, and $d_2$, 203, are measured and averaged over the sample frame and a representative value is derived therefrom. The inverse of this representative value gives the frequency, $f_1$, 204, of the frame 206. In like fashion the frame 207 has a frequency $f_2$, 205.

The frequency of a set of frames maps distinctly into a particular pitch through numerous mapping methods including a least squares approximation so that the best match is made. The matching of the frequency to the pitch is made so as to minimize the error.

This process of determining the frequency and mapping to a pitch is performed for each frame within the sample. The sequence of pitches defines the operator pitch input.

Figures 3, 4:
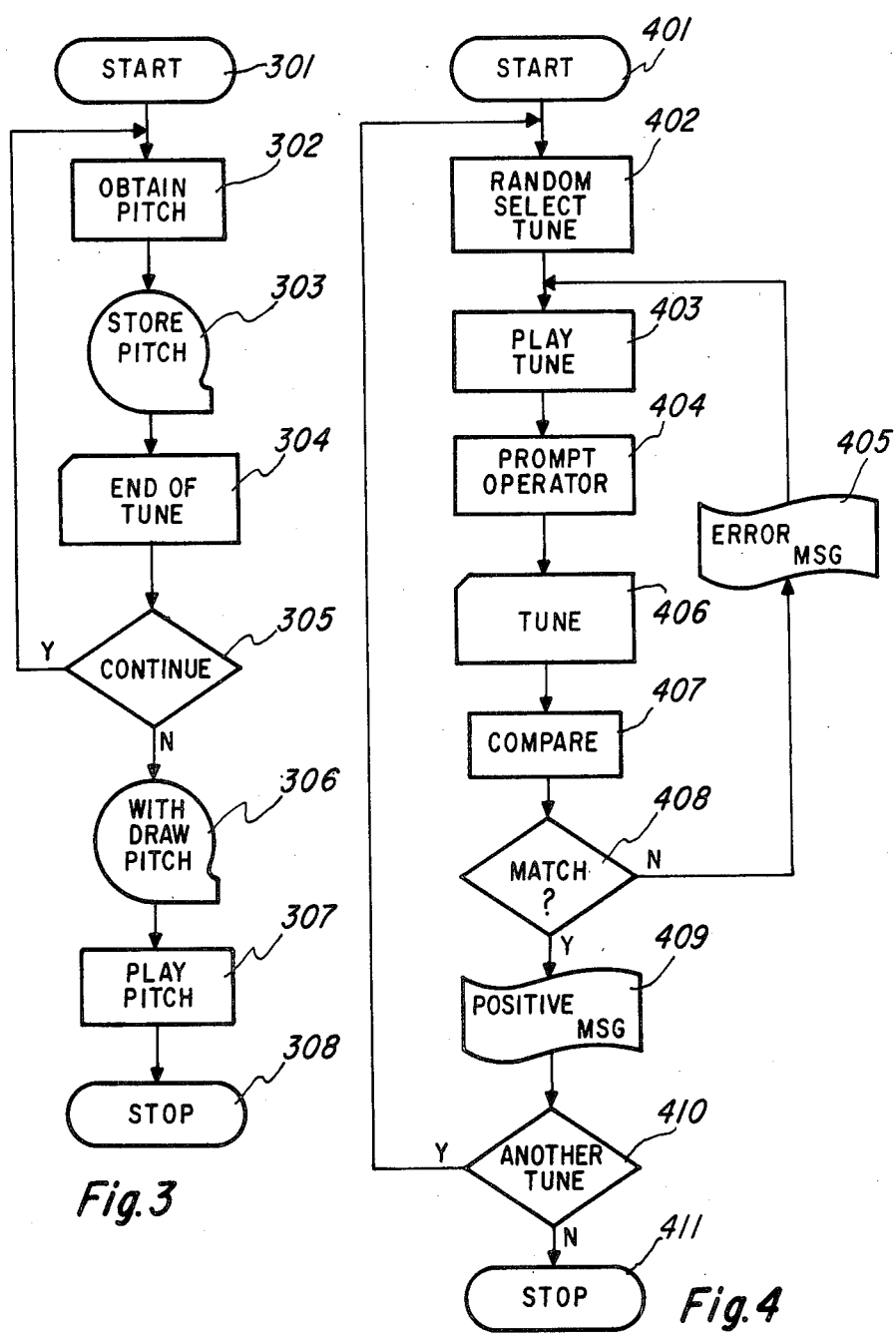
FIG. 3 is a flow chart of an operational mode of one embodiment of the invention.
FIG. 4 is a flow chart of the teaching mode of the invention.

FIG. 3 is a flow chart of the operation of a taught learning aid.

In this embodiment once the operation is initiated by the operator at the start, 301, the pitch of the operator input is obtained 302. The pitch, as obtained from the operator, is stored in some medium 303 and a scan is made of the keyboard or other input means, such as the detection of the end of tune by a simple energy detector, for the end of tune marker 304. Should an end-of-tune not be encountered, that is pitch detection should be continued, the operation returns to obtain another pitch from the user. If the operation is not to continue, 305, the sequence of pitches is recalled from memory 306 and reiterated or played back 307 to the operator.

In this mode the operator is "teaching" the learning aid a particular tune in which the learning aid receives the pitch sequence and stores it in memory for later play back to the operator. The operator/student is therefore capable of altering his tune, at his whim so as to generate the various pitches and thereby expand his capability.

Provision may be made to edit the sequence of tones so that the aid is "taught" a tune for playback for the enjoyment of the operator. In this case, 308 is replaced by a repeat on signal from the operator. In another embodiment, the aid is selectively requested to evaluate the tune and to generate a response based on the evaluation.

FIG. 4 is a flow chart of another embodiment of the operation of the learning aid.

The operation is initiated, 401, by the operator and a random tune is selected by the processor 402 from a library of prestored tunes. This tune is communicated 403 to the operator after which the operator is prompted 404, to attempt to mimic the tune generated. The tune generated by the operator is received, 406, and compared to the reference tune 407. The discrepancies between the received tune and the reference tune either generate an error message 405 or a match 408. If a match 408 occurs, a positive message 409 acting as reinforcement is given to the operator. The operator then selects if another tune 410 is to be given in which case the operation is repeated to 402; otherwise, the operation terminates, 411.

In this operational mode, the electronic learning aid generates a sequence of pitches which the operator is requested to mimic so as to learn pitches and tonal qualities during the mimic operation.

Figure 5:
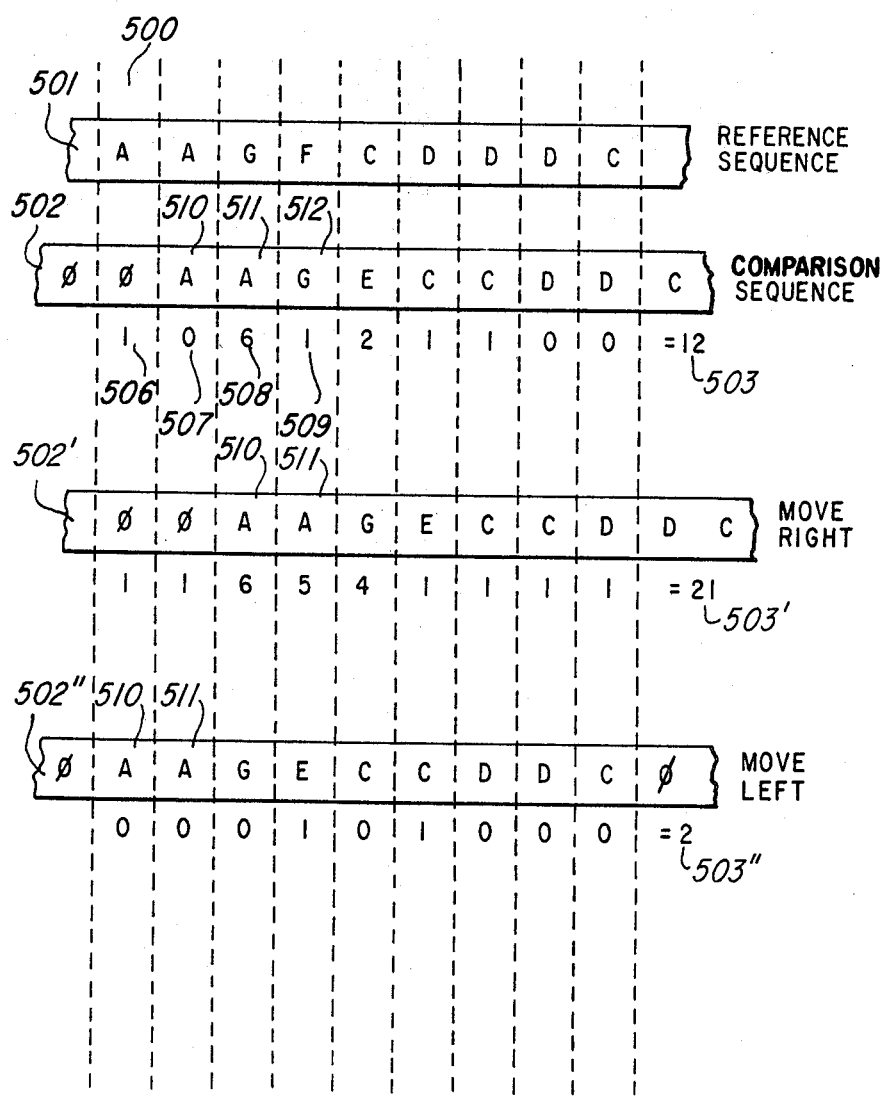
FIG. 5 illustrates a matching technique of the perceived pitches relative to the reference sequence for an embodiment of the invention.

FIG. 5 illustrates the matching of a reference sequence to the perceived or operator generated sequence.

The reference sequence 501 is comprised of a sequence of pitches such as 500 an "A". This sequence, as illustrated "A-A-G-F-C-D-D-D-C", is chosen from a library of reference sequences. The operator is prompted to respond, as indicated in FIG. 4 and generates a sequence of tones 502. This sequence 502 is compared, frame for frame, with the reference sequence 501 and each frame generates a comparison value such as 506, 507, 508, and 509. The summation of the comparison values yields a match value 503.

The received sequence is moved to the right, 502', and again frame for frame the reference sequence is compared to the operator generated sequence and again yields a match value 503'.

Since each frame is of a relatively short duration, the duration is appropriately reflected. Hence pitches 510 and 511 establish a tone of "A" which is twice as long as the pitch 512 for "G".

The operator generated sequence, is moved to the left, 502", and the sequence is compared to the reference sequence again frame for frame. This alteration yields a match value, 503". The movement of the operator generated sequence relative to the reference sequence is performed a number of times and the optimal match value is chosen. In this example, the optimal match value is 503" yielding a value of 2.

FIG. 6a pictorially illustrates a hand-held embodiment of the invention.

In this embodiment the electronic learning aid is in a single package 601 which contains all elements necessary for its operation. Optionally, plug in cartridges may be added, not shown, so as to expand the repertoire of sequences available in the learning aid. The learning aid, 601, is activated via a switch 605 so that the aid 601 communicates to the operator via a speaker 603. The operator is given a menu of choices in which he responds via a yes/no switch 604. Microphone 602 allows the aid 601 to receive the pitches generated by the operator/student.

FIG. 6b is another embodiment of the invention encased in a doll.

A doll is a companion type embodiment which encourages the young operator to interface with it since it is friendly. In this embodiment, speaker 603' communicates the tones to the child operator.

This invention allows the interplay and the transformation of the operator from a student responding only to posed questions to a teaching mode in the musical environment. The student optionally either teaches the aid or learns from the aid particular sequences either chosen by the aid or chosen by the student.

What is claimed is:

1. An electronic learning aid for teaching musical tones comprising:
   pitch indentifying means for determining at least a first pitch from an analog signal and producing a signal output indicative thereof;
   memory means storing digital speech data and digital control data from which sythesized human speech relating to interaction between the electronic learning aid and an operator thereof may be derived, said memory means including storage in which the signal output from said pitch identifying means may be temporarily stored, and further including library means storing a plurality of pitch data representative of a plurality of different pitches and combinable into a plurality of different sequences of pitch data;
   speech synthesizer means operably associated with said memory means for producing an analog signal alternatively representative of synthesized human speech or tones depending upon whether the data accessed from said memory means is digital speech data or pitch data;
   operator input means for providing an operator input to said pitch identifying means as at least a tone in an analog signal representative thereof;
   said pitch identifying means being responsive to an operator input from said operator input means as an analog signal for producing said signal output as determined by said operator input;
   control means operably associated with said pitch identifying means, said memory means, and said speech synthesizer means and for selectively accessing digital speech data and pitch data from said memory means for input to said speech synthesizer means;
   said memory means temporarily storing said signal output from said pitch identifying means as regulated by said control means for subsequent input to said speech synthesizer means upon selective access thereof by said control means,
   audio means coupled to said speech synthesizer means for converting said analog signals produced thereby alternatively into audible tones or audible synthesized human speech depending upon whether the data accessed from said memory means is pitch data or digital speech data; and
   said speech synthesizer means and said audio means cooperating with said control means and said memory means in audibly providing at least a tone as the response of the electronic learning aid corresponding to said operator input and audible synthesized human speech commenting upon the response of the electronic learning aid to the operator input.

2. An electronic learning aid as set forth in claim 1, wherein said control means is responsive to said signal output from said pitch identifying means for selectively accessing a sequence of pitch data from said library means of said memory means as a purported match of the operator input for input to said speech synthesizer means as the response of the electronic learning aid.

3. An electronic learning aid as set forth in claim 2, wherein said control means further includes an instruction set having at least a periodically randomly occurring instruction sequence intentionally directing said control means to selectively access a sequence of pitch data from said library means of said memory means which incorrectly matches the operator input.

4. An electronic learning aid as set forth in claim 1, wherein said control means dependent upon the end of said signal output from said pitch identifying means is responsive to recall said signal output as temporarily stored in said memory means for input to said speech synthesizer means; and
   said speech synthesizer means and said audio means cooperating to audibly provide a play back of a tonal sequence as the response of the electronic learning aid corresponding to said operator input.

5. An electronic learning aid as set forth in claim 1, wherein said operator input means comprises a microphone.

6. An electronic learning aid as set forth in claim 5, wherein said operator input means further includes a keyboard, and said control means being operably associated with said keyboard independently of said pitch identifying means.

7. An electronic learning aid for teaching musical tones comprising:
   pitch identifying means for determining at least a first pitch from an analog signal and producing a signal output indicative thereof;
   memory means storing digital speech data and digital control data from which synthesized human speech relating to interaction between the electronic learning aid and an operator thereof may be derived, said memory means including library means storing a plurality of pitch data representative of a plurality of different pitches;
   speech synthesizer means operably associated with said memory means for producing an analog signal alternatively representative of synthesized human speech or tones depending upon whether the data accessed from said memory means is digital speech data or pitch data;
   operator input means for providing an operator input to said pitch identifying means as at least a tone in an analog signal representative thereof; said pitch identifying means being responsive to an operator input from said operator input means as an analog signal for producing said signal output as determined by said operator input;
   control means operably associated with said pitch identifying means, said memory means, and said speech synthesizer means for selectively accessing digital speech data and pitch data from said memory means for input to said speech synthesizer means, said control means including
   random selection means for randomly selecting a particular portion of pitch data representative of at least a tone as stored in said library means of said memory means for input to said speech synthesizer means, and comparator means operably associated with said random selection means, said pitch identifying means and said library means for comparing said signal output from said pitch identifying means with the randomly selected portion of pitch data in determining the appropriateness of the operator input as an operator response attempting to repeat at least a tone with respect to said particular position of pitch data randomly selected by said random selection means;

audio means coupled to said speech synthesizer means for converting said analog signals produced thereby alternatively into audible tones or audible synthesized human speech depending upon whether the data accessed from said memory means is pitch data or digital speech data; and said speech synthesizer means and said audio means cooperating with said control means and said operator input means in audibly providing at least said tone as randomly selected by said random selection means and audible synthesized human speech requesting the operator to duplicate the randomly selected at least said tone via said operator input means, and said speech synthesizer means and said audio means being further responsive to said comparator means of said control means for providing an audible comment in synthesized human speech indicative of the accuracy of the operator response in relation to the attempted duplication by the operator via said operator input means of the particular portion of pitch data comprising said randomly selected at least said tone.

8. An electronic learning aid for teaching musical tones comprising:

pitch identifying means for determining respective pitches from an analog signal and producing a signal output indicative thereof;

memory means storing digital speech data and digital control data from which sythesized human speech relating to interaction between the electronic learning aid and an operator thereof may be derived, said memory means including storage in which the signal output from said pitch identifying means may be temporarily stored, and further including library means storing a plurality of pitch data representative of a plurality of different pitches and combinable into a plurality of different sequences of pitch data respectively representative of different musical tunes;

speech synthesizer means operably associated with said memory means for producing an analog signal alternatively representative of synthesized human speech or tones depending upon whether the data accessed from said memory means is digital speech data or pitch data;

operator input means for providing an operator input to said pitch indentifying means as a musical tune in an analog signal representative thereof;

said pitch identifying means being responsive to an operator input from said operator input means as an analog signal for producing said signal output as determined by said operator input;

control means operably associated with said pitch identifying means, said memory means, and said speech synthesizer means for selectively accessing digital speech data and pitch data from said memory means for input to said speech synthesizer means, said control means including random selection means for randomly selecting a particular sequence of pitch data representative of a musical tune as stored in said library means of said memory means for input to said speech synthesizer means, and comparator means operably associated with said random selection means, said pitch identifying means and said library means for comparing said signal output from said pitch identifying means with the randomly selected sequence of pitch data in determining the appropriateness of the operator input as a response attempting to repeat the musical tune corresponding to said particular sequence of pitch data randomly selected by said random selection means;

audio means coupled to said speech synthesizer means for converting said analog signals produced thereby alternatively into audible tones or audible synthesized human speech depending upon whether the data accessed from said memory means is pitch data or digital speech data; and said speech synthesizer means and said audio means cooperating with said control means and said operator input means in audibly providing said musical tune as randomly selected by said random selection means and audible synthesized human speech requesting the operator to duplicate the randomly selected musical tune via said operator input means, and said speech synthesizer means and said audio means being further responsive to said comparator means of said control means for providing an audible comment in synthesized human speech indicative of the accuracy of the operator response in relation to the attempted duplication by the operator of the particular sequence of pitch data comprising said randomly selected musical tune.

9. An electronic learning aid as set forth in claim 8, wherein said operator input means comprises a microphone.

10. An electronic learning aid as set forth in claim 9, wherein said operator input means further includes a keyboard, and said control means being operably associated with said keyboard independently of said pitch identifying means.

11. An electronic learning aid for teaching musical tones comprising:

pitch identifying means for determining respective pitches from an analog signal and producing a signal output indicative thereof;

memory means storing digital speech data and digital control data from which synthesized human speech relating to interaction between the electronic learning aid and an operator thereof may be derived, said memory means including storage in which the signal output from said pitch identifying means may be temporarily stored, and further including library means storing a plurality of pitch data representative of a plurality of different pitches and combinable into a plurality of different sequences of pitch data respectively respresentative of different musical tunes;

speech synthesizer means operably associated with said memory means for producing an analog signal alternatively representative of synthesized human speech or tones depending upon whether the data accessed from said memory means is digital speech data or pitch data;

said electronic learning aid being operable in plural operating modes including at least first and second operating modes;

operator input means alternatively providing an operator input to said pitch identifying means as at least a tone in an analog signal representative thereof in said first operating mode and providing an operator input to said pitch identifying means as a response attempting to repeat at least a tone in said second operating mode;

control means operably associated with said pitch identifying means, said memory means, and said speech synthesizer means for selectively accessing digital speech data and pitch data from said memory means for input to said speech synthesizer means, said control means being responsive to selectively provide pitch data representative of said signal output of said pitch identifying means from said memory means or pitch data from said library means of said memory means to said speech synthesizer means in an operating sequence determined by the operating mode of said electronic learning aid;

said memory means temporarily storing said signal output from said pitch indentifying means as regulated by said control means for subsequent input to said speech synthesizer means upon selective access thereof by said control means;

said control means including random selection means for randomly selecting a particular sequence of pitch data representative of a musical tune as stored in said library means of said memory means in said second operating mode for input to said speech synthesizer means, and comparator means operably associated with said random selection means, said pitch identifying means and said library means for comparing said signal output from said pitch identifying means with the randomly selected sequence of pitch data in said second operating mode in determining the appropriateness of the operator input as a response attempting to repeat the musical tune corresponding to said particular sequence of pitch data randomly selected by said random selection means;

audio means coupled to said speech synthesizer means for converting said analog signals produced thereby alternatively into audible tones or audible synthesized human speech depending upon whether the data accessed from said memory means is pitch data or digital speech data; and said speech synthesizer means and said audio means cooperating with said control means and said memory means in audibly providing at least a tone as the response of the electronic learning aid corresponding to said operator input and audible synthesized human speech commenting upon the response of the electronic learning aid to the operator input in said first operating mode;

said speech synthesizer means and said audio means cooperating with said control means and said operator input means in audibly providing such musical tune as randomly selected by said random selection means and audible synthesized human speech requesting the operator to duplicate the randomly selected musical tune via said operator input means in said second operating mode, and said speech synthesizer means and said audio means being further responsive to said comparator means of said control means in said second operating mode for providing an audible comment in synthesized human speech indicative of the accuracy of the operator response in relation to the attempted duplication by the operator of the particular sequence of pitch data comprising said randomly selected musical tune.

12. An electronic learning aid as set forth in claim 11, wherein said control means is responsive to said signal output from said pitch identifying means for selectively accessing a sequence of pitch data from said library means of said memory means in said first operating mode as a purported match of the operator input for input to said speech synthesizer means as the response of the electronic learning aid.

13. An electronic learning aid as set forth in claim 12, wherein said control means further includes an instruction set having at least a periodically randomly occurring instruction sequence intentionally directing said control means to selectively access a sequence of pitch data from said library means of said memory means which incorrectly matches the operator input.

14. An electronic learning aid as set forth in claim 11, wherein said control means dependent upon the end of said signal output from said pitch identifying means is responsive to recall said signal output as temporarily stored in said memory means in said first operating mode for input to said speech synthesizer means; and said speech synthesizer means and said audio means cooperating to audibly provide a play back of a tonal sequence as the response of the electronic learning aid corresponding to said operator input.

15. An electronic learning aid as set forth in claim 11, wherein said operator input means comprises a microphone.

16. An electronic learning aid as set forth in claim 15, wherein said operator input means further includes a keyboard, and said control means being operably associated with said keyboard independently of said pitch identifying means.

* * * * *